United States Patent Office 2,939,851
Patented June 7, 1960

2,939,851
PREPARATION OF URETHANES WHEREIN TRIETHYLENE DIAMINE IS USED AS THE CATALYST

Milton Orchin, Cincinnati, Ohio, assignor to Houdry Process Corporation, Wilmington, Del., a corporation of Delaware No Drawing. Filed May 23, 1957, Ser. No. 661,014

10 Claims. (Cl. 260—2.5)

The present invention relates to a catalytic process for the synthesis of urethanes and is more particularly concerned with the preparation of high molecular weight urethane polymers by reaction of isocyanates with organic hydroxy compounds.

The reactivity of the isocyanate group with compounds containing labile hydrogen has been largely described in the literature. Thus, it has been indicated, in general, that isocyanates under appropriate conditions will react with water, amines, alcohols, phenols, organic acids, etc. A classical example is the reaction between an alcohol and an aryl isocyanate to form a urethane structure in accordance with the following equation:

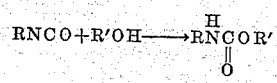

With the lower molecular weight primary alcohols reaction with aryl isocyanate proceeds exothermally and without difficulty; however, in the case of secondary and tertiary alcohols and with higher molecular weight primary alcohols, as those above about six carbon atoms, the addition of catalyst to initiate or control the reaction has been found necessary or desirable. The use of catalysts has also been advocated in the reaction of aryl-urethanes with cyclic alcohols as well as with phenols. Among the catalysts suggested for certain of these reactions there are included nitrogen bases such as pyridine, certain trialkylamines, N-alkyl morpholines, etc.

From a commercial development standpoint the interest in the isocyanate-hydroxy compound reaction is less concerned with simple urethane formation resulting from the reaction of monofunctional reactants than it is with reactions between polyisocyanates (generally di-isocyanates) and polyhydroxy compounds, particularly those of high molecular weight. Whereas, in reacting a monoisocyanate with a monomeric compound containing a single hydroxyl group, a simple urethane is generally formed, if the two reactants are bifunctional, the obtained product is polymeric; and if one of the reactants is polymeric, the ultimate product will be a modified polymer of higher molecular weight. Thus, in the reaction between di-isocyanate and glycol

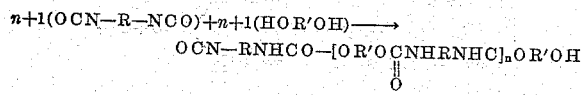

a polyurethane is formed, the nature of the terminal groups and the length of the chain being dependent on the reaction conditions including the concentrations of the reactants and their individual activities, as well as, to some extent, upon the nature and amount of catalyst employed. Important polyurethane compounds have been prepared in accordance with the above reaction employing as the hydroxy compound linear polyesters having terminal hydroxy groups such as those obtained by the reaction of a dicarboxylic acid with a glycol, diglycol or polyglycol. These linear polyesters are extended further by reaction with an arylene di-isocyanate producing linkages of the urethane type, which in the case of a polyester having terminal hydroxy groups may be illustrated, as above, where R' of

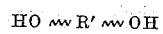

is a high molal ester of a dibasic acid, such as dilinoleic acid, and a diol, such as diethylene glycol. Since each of these urethane linkages contains available hydrogen (>NH) for reaction with more isocyanate, these chain-extended polymers can be further cross-linked at various locations along the chain by additional di-isocyanate.

Reactions of the type illustrated above have been employed in the preparation of polyurethanes having highly viscous, syrupy or elastomeric properites such as the so-called Vulcollans, as well as more highly cross-linked materials which are by nature insoluble and infusible. By the use of water in the reaction, terminal isocyanate groups form ureides and carbon dioxide is liberated with the consequent formation of foamed cellular or sponge-like materials.

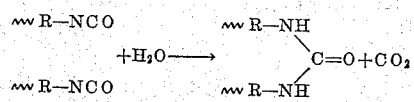

It has now been found that the reaction between an isocyanate and an organic hydroxy compound is accelerated or promoted by the use of a novel catalyst in the form of triethylene diamine of the structure

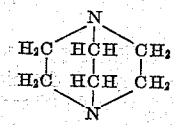

also called diazabicyclo-[2.2.2]-octane.

The novel catalyst above described has, in general, been found to be of the order of ten times as reactive as the earlier employed typical catalysts for reactions between isocyanates and hydroxy compounds, such as the usual N-alkyl morpholines or trialkylamines, in that the desired reaction can be promoted using quantities of 1/10 as much of the triethylene diamine on a weight basis or the required reaction time can be considerably reduced. The triethylene diamine has further added advantages over these other catalytic agents heretofore used, in having very low volatility, high thermal stability and in having higher basicity per unit weight of compound, which makes for more effective use of the compound, a faster cure in polymeric plastics and minimizes the time and temperature required for any after-cure, obtaining a polymeric product uncontaminated by thermal dissociation products.

In the production of flexible foams it is considered necessary and it is generally the practice to include in the formulation of the reaction mixture emulsifying agents to obtain satisfactory foams. It has been found in the case of the triethylene diamine catalyst, that satisfactory foams are obtained without emulsifying agent in many instances that this cannot be done when using other reactive amine catalysts.

The triethylene diamine can be prepared by methods described in prior literature (see for example, Ishiguro et al., Journal Pharmaceutical Society, Japan, 1955, volume 75, pages 1370–1373) such as by reaction of N-haloalkyl derivatives of piperazine hydrohalides over silica-alumina catalyst at 240–250° C.; or by the methods described in the co-pending U.S. patent application of E. C. Herrick, Serial No. 628,723, filed December 17, 1956. According to said co-pending application, triethylene diamine is obtained in acceptable yields by vapor phase cyclization of aliphatic amines, for example diethylene triamine, over acidic silica-alumina catalyst, at a temperature of about 675° F., and separation of the desired reaction product from accompanying piperazine compounds formed and from other minor reaction byproducts. The triethylene diamine is readily obtained as a fraction of 90–95% purity and can be further purified to 99%+ purity. Such high purity is not necessary for use of the material in the described catalytic reactions, and because of the relatively small amounts of the catalyst used, triethylene diamine of as low as 90% purity can be employed without significant adverse effects.

In general the triethylene diamine can be employed for the reactions between isocyanate and organic hydroxy compounds in the same manner as the other amine catalysts heretofore advocated. While in the absence of catalyst the reactions between phenyl isocyanate and methyl isobutyl carbinol does not take place to significant extent in boiling toluene, this reaction is readily initiated at room temperature in the presence of a fraction of a gram of the triethylene diamine catalyst per liter of reaction mixture, and proceeds satisfactorily at a rate of several times as fast as in the case of N-ethyl morpholine catalyst. In the presence of such small amounts of triethylene diamine as catalyst, also the reaction of secondary alcohols with naphthyl isocyanates will take place with extreme rapidity as is illustrated by the following reaction:

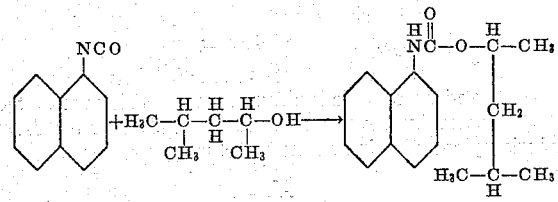

From what has been indicated above, it is apparent that the use of the triethylene diamine catalyst finds its more important advantages in those reactions between isocyanates and organic hydroxy compounds which are not propagated or do not proceed at all in the absence of catalyst; or which, without catalyst, require such high initiation temperatures to induce initial reaction that the control of the ensuing reaction, particularly if exothermic, becomes extremely difficult or impossible. The triethylene diamine catalyst can be used to advantage, for example, in the typical reactions between arylene diisocyanates and dihydric or higher polyhydric alcohols to form high molecular weight polyurethanes containing the repeated chain structure $$\left[ -\overset{O}{\underset{\|}{C}}-\overset{H}{\underset{}{N}}-R-\overset{H}{\underset{}{N}}-\overset{O}{\underset{\|}{C}}-OR'-O- \right]_x$$

derived from $R(NCO)_2$ and $HOR'OH$.

As examples of reactions which can be promoted by the described triethylene diamine catalyst are those involving any of the typical isocyanates given in the table below with any one of the dihydric or other polyhydric alcohols listed:

| Isocyanates | Hydroxy Compounds |
|---|---|
| m. phenylene diisocyanate. | ethylene glycol. |
| tolylene diisocyanate. | propylene glycol. |
| naphthylene-2,4-diisocyanate. | polyethylene glycol. |
| cyclohexylene diisocyanate. | hydroxy polyesters. |
| benzene triisocyanate. | glycerol. |
| p. phenylene diisocyanate. | cyclohexanediol. |
| diphenyl methane diisocyanate. | sorbitol. |
| butylene-1,4-diisocyanate. | 1,4-butanediol. |
| 2-methyl butane-1,4-diisocyanate. | hexamethylenediol. |
| 3,3'-dimethyl-4,4'-biphenylene diisocyanate. | |
| 3,3'-dimethoxy-4,4'-biphenylene diisocyanate. | |

These reactions can be carried out, for example, using enough of the isocyanate compound to react each —NCO group with a hydroxy group or slightly in excess of that quantity. The catalyst is effective in concentrations as low as 1% by weight of the polyisocyanate compounds in the reaction mixture. In the presence of adequate catalyst these reactions are initiated at room temperature or, in some instances moderate heating may be found desirable to reduce the induction period.

The synthesis of polyurethanes is of principal commercial interest in the formation of high molecular weight cross-linked polymers having elastomeric properties. For this reaction the organic hydroxy compound employed is usually a long chain linear polyester having free terminal hydroxy groups at the extremities of the chain. Desirable polyesters for this reaction are those having a molecular weight in the order of 2000 to 3000 and having about 1 to 2% by weight hydroxyl content. Typical polyesters of this kind include polyethylene adipate, poly 1–2 propylene adipate, polyethylene and poly-propylene succinate, polyethylene sebacate, and polyethylene azelate. These esters are familiarly prepared by reacting the glycol and acid components in the temperature range of 160–220° C. to partially remove water within 20 to 40 hours and further water removal by heating under vacuum. The active hydroxyl hydrogens available at the ends of the polyester chain are capable of reacting with di-isocyanates to form chain extended compounds having repeated urethane linkages. The favored isocyanate compounds employed for extension of the polyester chain and for the formation of branched polymers are the phenylene and naphthylene di-isocyanates, particularly the 1:5 naphthylene isomer and 2:4 tolylene isomer.

The triethylene diamine catalyst is beneficial in accelerating the chain-extending reaction between the di-isocyanate and the hydroxy polyester as well as the subsequent cross-linkage reactions. Some excess of the isocyanate and up to about 25–50% excess of the stoichiometric quantity based on the hydroxyl content of the polyester is recommended in the formation of desired elastomeric polymers. For polyesters of the type and molecular weight indicated above the di-iosyanate will comprise usually about 15 to 35% by weight of the polyester charge.

The reaction can be effected in a number of ways. In accordance with one method the polyester is carefully freed of water and heated to 130° C. and all of the di-isocyanate then added. An exothermic reaction takes place and is completed in a relatively short period of several minutes. The reaction product is kept free of water to avoid secondary reactions prior to final "curing" by cross-linking. In a modified method, less than the stoichiometric equivalent of the di-isocyanate is initially added to the preheated (about 130° C.) and dewatered polyester, the remainder being added for the subsequent cross-linkage reaction with the hydrogen atoms of the formed urethane linkages across several chains. Modified products can be obtained by effecting the ultimate cross-linking by means of other reactive agents such as amines, glycols, or water.

In the reaction of water with an isocyanate-polyester a urea bridge is formed with evolution of $CO_2$, thus:

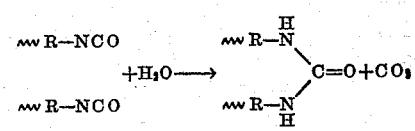

and the hydrogen atoms of the urea group so formed are in turn capable of reacting with unreacted isocyanate polyesters in the reaction mixture with the formation of three-dimensional cross-linked super molecules.

With the use of water as the cross-linking agent, the liberated $CO_2$ gas serves as a "blowing" agent, producing spongy polymers of desired uniformity in cell structure and excellent softness. In cross-linking reactions effected in substantial absence of water, plastic compositions are obtained by molding or casting of the reaction mixture and subsequent curing in situ. The pressure of the triethylene diamine as catalyst in very small amounts, often as low as 10 parts per million or less by weight of the polyester, accelerates the cross-linking reaction. Ordinarily the catalyst is added to the initial reactants—di-isocyanate and polyester— and no further catalyst addition will be required for promoting the final cure; if desired, however, and particularly in those instances where the initial catalyst addition is at a minimum, further addition of catalyst can be made in the cross-linking stage by stirring such catalyst into the molten reaction product.

The reaction mechanism for the formation of foamed products from a hydroxy polyester and di-isocyanate can be illustrated, as follows:

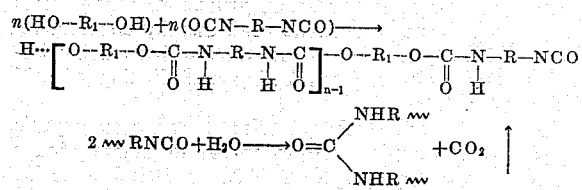

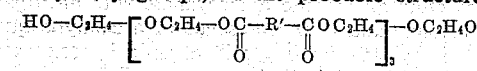

Example I 2 parts by weight of triethylene diamine were dissolved in 5 parts of water and 15 parts of lecithin added thereto as an emulsifying agent, followed by 300 parts of a hydroxy polyester having an average molecular weight of about 2000 prepared by esterification of dimerized linoleic acid with diethylene glycol (as hereinafter described). The mixture was well homogenized by thorough stirring and about 85 parts of tolylene 2-4 di-isocyanate (about 3 mols di-isocyanate per mol of hydroxy ester) added rapidly while stirring. The reaction mixture was poured into a mold and after a few seconds, the polyurethane foam filled the mold and set to a soft spongy product which was readily removable from the mold. The obtained product was light cream colored and of satisfactory fine texture, had the typical resilience of the best polyurethane foams. The sponge product was comparatively light in weight, being evenly raised with uniformly distributed cellular structure, and was free of unpleasant odor.

Example II

The conventional preparation of a foamed polyurethane elastomer is as follows: to about 5 parts of water and 20 parts of N-ethyl morpholine there is added about 15 parts of an emulsifying agent such as lecithin followed by the addition of 300 grams of polyester having an average molecular weight of 2000 and having approximately two free terminal hydroxyl groups in the molecule. The mixture is stirred thoroughly to homogenize it. There is then added rapidly 85 parts of tolylene di-isocyanate. The mixture is stirred well and poured into a mold. After a few seconds the polyurethane fills the container and, after a period of curing, the foamed elastomer is dry and can be removed from the container. The product is a cream colored fine textured spongy solid typical of foamed polyurethanes.

It is to be noted that the catalyst of Example I is new to the art of polyurethane synthesis. It is not only more efficient than the contemporary highly rated N-ethyl morpholine, effecting the condensation reaction with $\frac{1}{10}$ the quantity of catalyst, but also produces a superior foamed product in shorter curing time. The new catalyst of our invention is, therefore, outstandingly more versatile than the conventional amine catalysts.

Example III

In an operation similar to that described in Example I with the exception that 15 parts lecithin emulsifier were omitted, a foamed polyurethane product was produced of excellent texture using triethylene diamine catalyst.

Example IV

In an operation similar to Example II with the exception that the 15 parts of lecithin emulsifier were omitted, we have not been able to prepare a satisfactory foam using the same polyester and foam formulation with N-ethyl morpholine or other conventional amine catalysts.

The hydroxy polyester employed in the foregoing examples is prepared from the acid product formed by known thermal dimerization of linoleic acid at 500° F. in the presence of a trace of moisture. It is generally believed that one mole of the acid rearranges thermally to a conjugated form and a Diels-Alder type addition takes place to produce a dibasic acid having a central cyclic structure. The obtained product consists of about 72% dimeric acid $-C_{34}H_{62}(COOH)_2-$ and the remainder mostly trimeric or higher polymers. The acid product is esterified by melting the same together with diethylene glycol and heating over a period of 20–40 hours at 160 to 200° C. to partially remove water, followed by further heating at this temperature under vacuum to finish water removal. The esterification components are employed in proportions providing about 4 mols of the diethylene glycol for each 3 mols of dicarboxy acid (taken as 90% pure). In this reaction 6 mols of water are split out with the formation of a polyester of approximately 2000 molecular weight having two terminal hydroxy groups, of the probable structure:

$$HO-C_2H_4-\left[OC_2H_4-O\underset{O}{\overset{\|}{C}}-R'-\underset{O}{\overset{\|}{C}}OC_2H_4\right]_n-OC_2H_4OH$$

By increasing the quantity of triethylene diamine catalyst tenfold in the process of Example I; reaction began immediately upon addition of the isocyanate with the initiation of foaming and setting even before the mixture could be stirred. Because of the rapidity of the reaction a denser and less foamy product was obtained with many of the air pockets being noticeably larger in size than in the previous product, and most of the mass had a glazed or jellied appearance. By appropriate selection of the quantity of triethylene diamine catalyst within limits and the utilization of suitable facilities for stirring the reaction mixture, it is possible to control the reaction rates and the texture of the foamed products. Thus, the quantity of triethylene diamine catalyst employed in Example I can be reduced to ½ part in 300 parts of polyester with the production of satisfactory foamed products; quantities of this catalyst in excess of about 1% by weight of the polyester are not to be ordinarily recommended for foam products since the reaction becomes too rapid for best practical operations.

It is further to be noted that many of the foams prepared when using the prior amine catalysts have an unpleasant odor, whereas in none of the polyurethane foams prepared with the triethylene diamine catalyst have malodorous products been noted. While no conclusive explanation for this important advantage of the triethylene diamine catalyst can be offered, it is to be noted that the low volatility of the triethylene diamine and its high thermal stability as compared with N-ethyl morpholine, for example, and the more pleasant odor than that of the morpholines, as such, or their thermal dissociation products may account for this observed difference in odor of the polymer formed. Moreover, the comparatively low volatility and excellent stability of the triethylene diamine catalyst affords an added advantage in the preparation of stable molding powders and other "ready-to-use" compositions containing the catalyst in a mixture with the hydroxy compound and other components of the reaction mix to which isocyanate is to be added.

For non-foamed polymers useful as thermoplastic elastomers, insulations, coating compositions, etc., final curing or cross-linking is effected in substantial absence of water, e.g., with alcohols, amines, etc.

In the preparation of polyurethane coating compositions with the usual amine catalysts of the prior art, the final cure of the coating is ordinarily carried out at about 150° C.; with the triethylene diamine catalyst, on the other hand, it has been found possible to obtain the desired cure at considerably lower temperature and in most instances even at room temperature.

As is understood in the art, the nature of the linking and cross-linking groups has an important influence on the physical properties of linear polymers. For example, the presence of "spacious" groups at regular intervals of the chain is a factor influencing elastic properties. In the polyurehane polymers of the type above described, the use of naphthylene di-isocyanate instead of tolylene di-isocyanate for reaction with the hydroxy polyester results in greater rigidity and different tear resistance. While aliphatic di-isocyanates could also be reacted in the same manner with the described hydroxy polyester, the modified polymers thus obtained are not comparable with the preferred elastomers obtained from arylene di-isocyanates.

Obviously many modifications and variations of the present invention as hereinbefore set forth may be made without departing from the spirit and scope thereof and therefore only such limitations should be imposed as are indicated in the appended claims.

What is claimed is:

1. The method of producing urethanes which comprises reacting an arylene di-isocyanate with an organic hydroxy compound in the presence of a catalytic quantity of triethylene diamine, said organic hydroxy compound being selected from the group consisting of: polyhydric alcohols and linear polyesters having terminal hydroxy groups, which polyesters are obtained from reaction of a polycarboxylic acid with a polyhydric alcohol.

2. The method of producing polyurethanes which comprises reacting an arylene di-isocyanate with a polyhydric alcohol in the presence of catalytic quantities of triethylene diamine.

3. The method of producing urethanes which comprises reacting an arylene di-isocyanate with a dihydric alcohol in the presence of catalytic quantities of triethylene diamine.

4. The method of producing high molecular polymers which comprises reacting an arylene di-isocyanate with a linear hydroxy polyester having terminal hydroxy groups, in the presence of catalytic quantities of triethylene diamine, said linear polyester having a molecular weight of about 2000 to 3000 and being the reaction product of a polyhydric alcohol with a polycarboxylic acid.

5. The method of producing polyurethane foams which comprises reacting an arylene di-isocyanate with a long chain hydroxy polyester having terminal hydroxy groups in the presence of a small amount of water, effecting release of carbon dioxide in the reaction, and wherein said reaction is catalyzed by the presence of triethylene diamine in an amount not in excess of about 1% by weight of said polyester; said hydroxy polyester being the reaction product of a polyhydric alcohol with a polycarboxylic acid.

6. The method of forming cross-linked and foamed polyurethane products which comprises adding a small quantity of water in the presence of triethylene diamine catalyst to a prepolymer-containing reaction mixture obtained by reacting arylene di-isocyanate with a long chain hydroxy polyester reaction product of a polyhydric alcohol with a polycarboxylic acid, thereby effecting release of $CO_2$ by reaction of the water with available isocyanate groups and also effecting cross-linking of said prepolymer.

7. The method which comprises reacting an organic polyisocyanate having two to three isocyanate groups with a hydroxy polyester of 2000 to 3000 molecular weight having terminal hydroxy groups and with water in the presence of triethylene diamine to form a chain extended and cross-linked polymer of said polyester, said hydroxy polyester being the reaction product of a polyhydric alcohol with a polycarboxylic acid.

8. The method according to claim 7 wherein said polyisocyanate is a tolylene di-isocyanate.

9. The method according to claim 7 wherein said polyisocyanate is a naphthylene di-isocyanate.

10. The method of producing polyurethane foam which comprises reacting tolylene di-isocyanate with a hydroxy polyester of 2000 molecular weight having only terminal hydroxy groups and with water in the presence of triethylene diamine, said triethylene diamine being present in an amount of up to about 1% by weight of said polyester and said polyester being the reaction product of a polyhydric alcohol with a polycarboxylic acid.

References Cited in the file of this patent

UNITED STATES PATENTS

| | | |
|---|---|---|
| 2,729,618 | Muller | Jan. 3, 1956 |
| 2,779,689 | Reis | Jan. 29, 1957 |

FOREIGN PATENTS

| | | |
|---|---|---|
| 712,053 | Great Britain | July 14, 1954 |

OTHER REFERENCES

Saunders et al.: "Chemical Reviews," 1948, volume 43, pages 205–218, page 209 relied upon.

UNITED STATES PATENT OFFICE
CERTIFICATE OF CORRECTION

Patent No. 2,939,851 June 7, 1960

Milton Orchin

It is hereby certified that error appears in the printed specification of the above numbered patent requiring correction and that the said Letters Patent should read as corrected below.

Column 5, line 1, for "pressure" read -- presence --.

Signed and sealed this 31st day of January 1961.

(SEAL)
Attest:

KARL H. AXLINE
Attesting Officer

ROBERT C. WATSON
Commissioner of Patents